9489X
W. Burgess.
Fire-Place.
Patented Mar. 12, 1836.
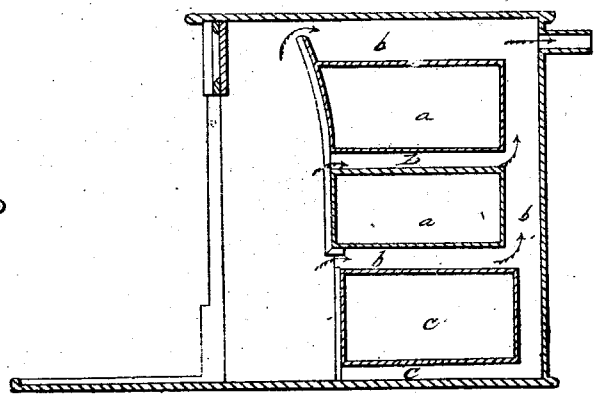
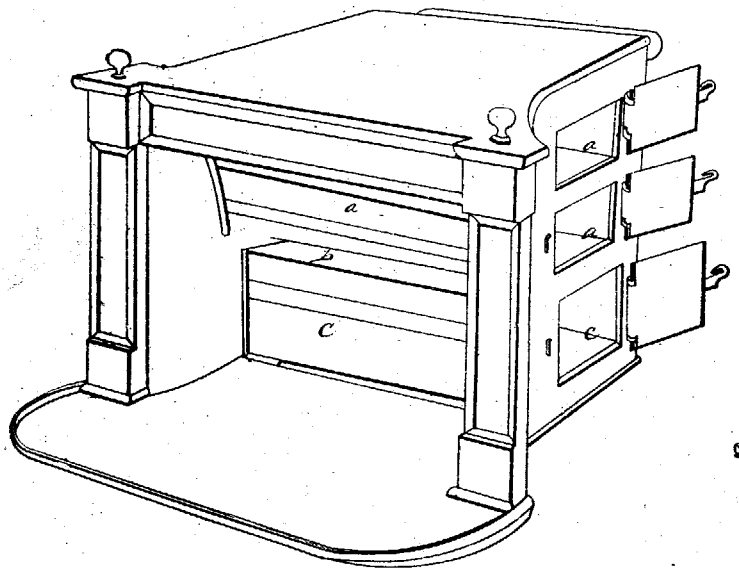

9489X
W. Burges,
Fire Place.
Patented Mar. 12. 1836.
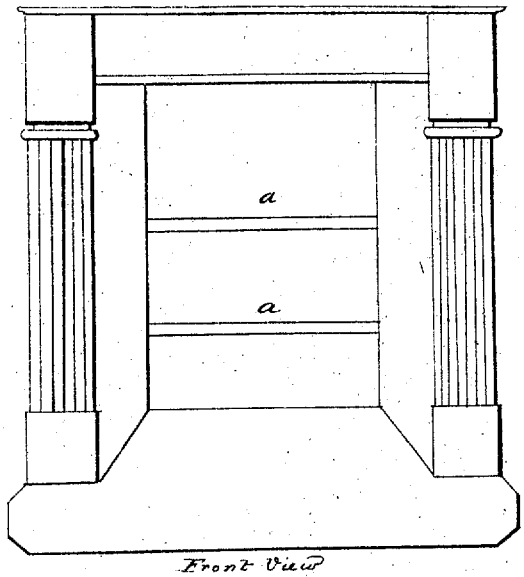
Front View
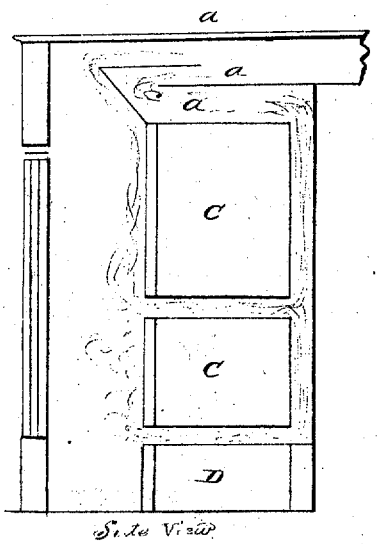
Side View 179.
9489X William Burgess The Schedule referred to in these Letters Patent and making part of the same, containing a description in the words of the said William Burgess of his Improvement in the cast Iron Fire place for warming, cooking, baking &c.

---

To all to whom these presents shall come: Be it known that I, William Burgess, of Middleborough, in the County of Plymouth and Commonwealth of Massachusetts, have invented a new and useful improvement in the contruction of the "cast Iron Fire place", and that the following is a full and exact description of the construction and operation of said Fire place, as invented or improved by me. My improvement consists in applying an oven and Cooking apparatus, at the back of the common cast iron Fire place or frame. The front part or frame of my fire place is of the usual form and size of the open fire place or frame; at the back of this I attach an oven of any convenient form and size; this oven may be divided into any number of apartments which may be required for cooking. The oven is heated by means of flues or appertures leading from the back, or that part of the fire place which comes in contact with the fire, and extending all round the oven. Through these flues and apertures the heat and smoke pass and heat the ovens. These flues or apertures I make the whole width of the fire place and about one inch in depth - at the bottom of that part of my fire place which contains the ovens, there is an apartment for heating air to assist in warming the room. That part of the fire place which contains the ovens and Cooking apparatus, may be cast with the fire place, or it may be cast separate and applied to the common fire frame - The particular advantage which this fire place has over most others consists in having an open fire place, together with all the advantage of the most approved close and cooking stoves. Attached to this specification is a drawing of my improvement, and making a part of this specification. What I claim as my improvement, is the application of the oven

9489X and cooking apparatus to the common open fire place or frame as above described.

William Burgess

Witnesses.

Ethan Eagle

James H. Hallett

[429 words]

Ex. 1896.

(Read and Recorded April 25. 1847.—

Drawing made